Dec. 15, 1925.  W. W. HUNT  1,565,941

HEEL

Filed Aug. 31, 1923

Inventor
WILLIAM W. HUNT his Attorneys

Patented Dec. 15, 1925.

1,565,941

UNITED STATES PATENT OFFICE.

WILLIAM W. HUNT, OF BEXLEY, OHIO, ASSIGNOR, BY MESNE ASSIGNMENTS, TO WILLIAM W. HUNT, FREDERICK A. MILLER, EDWARD E. LERCH, JOHN E. LERCH, AND ORR H. WILLIAMS, ALL OF COLUMBUS, OHIO.

HEEL.

Application filed August 31, 1923. Serial No. 660,302.

*To all whom it may concern:*

Be it known that I, WILLIAM W. HUNT, a citizen of the United States, residing at Bexley, in the county of Franklin and State of Ohio, have invented a certain new and useful Improvement in Heels, of which the following is a specification.

Rubber heels have been made either as whole heels or half heels. Whole heels are manufactured with the base lift or base of leather or hard rubber for attachment directly to the primary sole. The soft rubber half heels, especially the half heels for repair or replacement jobs are commonly provided with nail stops in the form of small metallic rings embedded at the proper points within the molded heel. Such stops have involved a high cost in the matter of time and money because of the necessity of placing each one on a pin in the bottom of the heel mold.

The object of the present invention is more especially to provide a whole heel in which the nail stop is formed by projecting the hard rubber or rubber compounded base or base lift at the necessary points and to the desired distance into the soft rubber top lift. A further object is to effect a more intimate and tighter relation between the top and base lift. Other objects may be gathered from the following description.

The invention is embodied in the example herein shown and described the features of novelty being finally claimed.

In the accompanying drawing—

Figure 1:
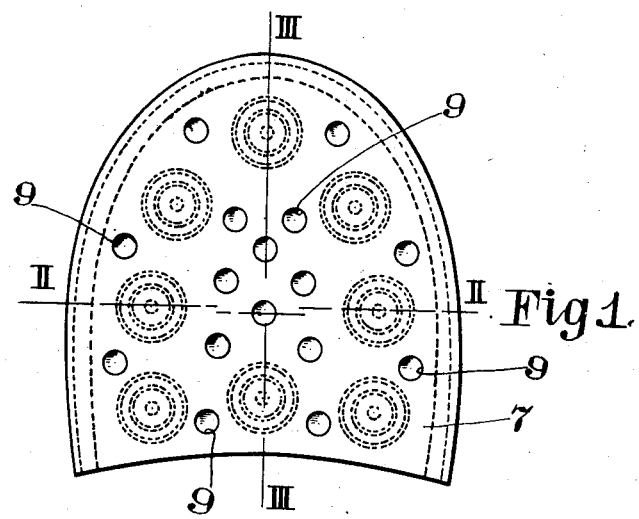
Figure 1 is a top plan view of the heel as prepared for the manufacturer.
Figures 2, 3:
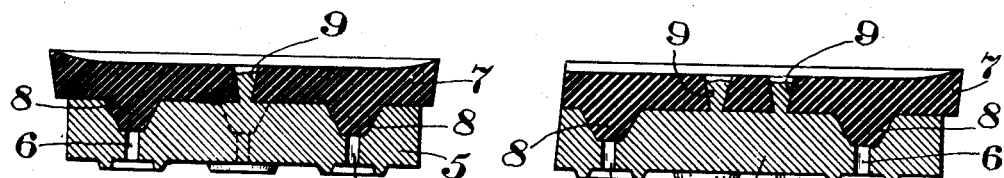
Fig. 2 is a section on the line II—II Fig. 1.
Fig. 3 is a section on the line III—III Fig. 1.
Figure 4:
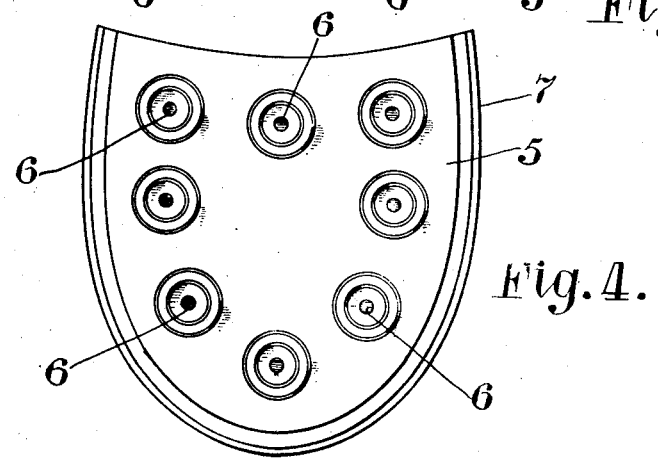
Fig. 4 is a plan view of the bottom or tread of the heel.

In the views 5 designates the top or soft rubber lift said lift being molded with nail holes 6. The character 7 designates the base lift of hard rubber composition or other suitable plastic material said lift having conical extensions 8 reaching to the top of the nail holes 6. The base lift is provided with several openings 9 into which the soft rubber flows in the molding operation.

In manufacturing such a heel the bottom plate contains the pins for forming the nail holes, the middle member forms the edge of the soft rubber part while the top member forms or receives the outer rim of the base lift. The bottom or soft portion is first put into the mold in the rough and then the hard portion which is shaped and prepared in advance is placed upon the soft portion and pressure applied during the vulcanizing process. The conical portions of the base lift penetrates the soft portion and the overflow oozes up into the openings 9 thus effecting a keyed and close union between the two lifts supplementing the vulcanizing union. The breast of the heel is formed so as to require no trimming but the base lift elsewhere is left with a shoulder or rind to be trimmed off after application to the sole. This process permits a neat finishing of the heel and the obliteration of any line of division between the hard and soft lifts.

The forms of the parts can be changed and the process varied without departing from the gist of the invention as claimed.

What I claim is:

1. A heel comprising, in combination, a resilient tread portion of soft rubber and a base therefor of hard rubber formed with closed nail-stopping projections extending into the resilient portion and vulcanized thereto.

2. A heel comprising, in combination, a resilient tread portion of soft rubber provided with nail holes and a base portion therefor of hard rubber formed with projections extending into the resilient portion and vulcanized thereto, said projections forming nail stops in line with said holes.

WILLIAM W. HUNT.